United States Patent
Wallen et al.

(10) Patent No.: US 10,302,742 B2
(45) Date of Patent: May 28, 2019

(54) RECEIVER ARCHITECTURE FOR INCREASED ROBUSTNESS TO RADAR INTERFERENCE

(71) Applicant: SAAB AB, Linkoeping (SE)

(72) Inventors: Max Wallen, Moelnycke (SE); Bruno Lumetzberger, Saevedalen (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 15/760,760

(22) PCT Filed: Sep. 21, 2015

(86) PCT No.: PCT/SE2015/050981
§ 371 (c)(1),
(2) Date: Mar. 16, 2018

(87) PCT Pub. No.: WO2017/052425
PCT Pub. Date: Mar. 30, 2017

(65) Prior Publication Data
US 2018/0267141 A1    Sep. 20, 2018

(51) Int. Cl.
*G01S 7/292* (2006.01)
*G01S 7/36* (2006.01)
*G01S 7/285* (2006.01)

(52) U.S. Cl.
CPC .............. *G01S 7/36* (2013.01); *G01S 7/2921* (2013.01); *G01S 7/285* (2013.01)

(58) Field of Classification Search
CPC .... H04B 1/1036; H04B 15/00; H04B 1/7103; H04B 2201/709709; H04B 17/345;
(Continued)

(56) References Cited

U.S. PATENT DOCUMENTS 5,294,933 A *  3/1994  Lee .................... G01S 13/0209
                                                342/159
6,704,378 B2 *  3/2004  Jagger ................. H04B 1/1036
                                                375/346
(Continued)

FOREIGN PATENT DOCUMENTS

WO    WO 2005/076483 A1    8/2015

OTHER PUBLICATIONS

International Searching Authority, International Search Report and Written Opinion for International Application No. PCT/SE2015/050981, dated Jun. 17, 2016, 10 pages, Swedish Patent and Registration Office, Sweden.
Extended European Search Report for European Application No. 15904824.8 completed Mar. 22, 2019, dated Apr. 1, 2019, 9 pages.

*Primary Examiner* — Olumide Ajibade Akonai
(74) *Attorney, Agent, or Firm* — Alston & Bird LLP (57) ABSTRACT

The present disclosure relates to exemplary embodiments of radar systems for providing increased robustness against radar interference transmissions and methods for controlling such radar systems. The radar system comprises at least one radar antenna configured at least for receiving a radar signal, a radar signal dividing means, a first receiver device and a second receiver device. The first receiver device is configured for monitoring a first frequency range and the second receiver device is configured for monitoring a second frequency range, wherein the second frequency range is wider than the first frequency range and the first frequency range is a subset of the second frequency range. The second receiver device is configured for measuring interference levels within the second frequency range. The present disclosure further relates to exemplary embodiments of methods for controlling the radar system, wherein the methods refer to measuring interference levels within the second frequency range, analysing measured interference levels, determining favorable frequency channels within the second (Continued)

frequency range in respect to interference level and possibly changing operating frequency channel in respect to measured interference levels.

8 Claims, 5 Drawing Sheets

(58) Field of Classification Search
CPC .......... H04B 1/10; H04B 2201/709718; H04B 1/719; H04B 1/7097; H04B 1/715; G01S 1/045; G01S 7/023; G01S 7/292; G01S 7/4021; G01S 7/36
See application file for complete search history.

(56) References Cited

U.S. PATENT DOCUMENTS

| | | | | |
|---|---|---|---|---|
| 2003/0216122 | A1* | 11/2003 | Cordone | H04B 1/1027 455/63.1 |
| 2007/0183547 | A1* | 8/2007 | Fifield | H04B 1/123 375/349 |
| 2014/0266863 | A1 | 9/2014 | Larsson et al. | |
| 2014/0269374 | A1* | 9/2014 | Abdelmonem | H04L 5/0026 370/252 |
| 2014/0347213 | A1 | 11/2014 | Nguyen et al. | |
| 2015/0084811 | A1* | 3/2015 | Mazzaro | G01S 13/343 342/176 |
| 2018/0074165 | A1* | 3/2018 | Martone | G01S 7/282 |

* cited by examiner

RECEIVER ARCHITECTURE FOR INCREASED ROBUSTNESS TO RADAR INTERFERENCE

CROSS REFERENCE TO RELATED APPLICATIONS

This application is a National Stage Application, filed under 35 U.S.C. § 371, of International Application No. PCT/SE2015/050981, filed Sep. 21, 2015; the contents of which are hereby incorporated by reference in their entirety.

BACKGROUND

Related Field

The present disclosure relates to a radar system, and a method for controlling such radar system, for providing increased robustness against radar interference transmissions. Exemplary embodiments of the present disclosure may e.g. be applied in ground-based, naval and airborne applications.

Description Of Related Art

The continuously increasing use of applications using electromagnetic waves to transfer information, the increasing bandwidth used for telecommunication etc. makes the available frequency spectrum more and more crowded, wherein interference of transmissions at neighbouring frequencies is a more and more imminent problem for e.g. radar applications.

For radar applications an even more significant problem is deliberate, hostile transmission of radar interference transmissions such as e.g. active jamming. Radar interference transmissions may degrade the performance of the radar system or, if occurring within the same operating frequency range as used by a radar, drown possible radar echoes, also referred to as response signals, by overpowering such signals. In order to address the problems with radar interference transmissions a common approach is to use separate antennae systems, dedicated to detecting radar interference transmissions, which obviously adds cost and complexity to the radar system. Other existing solutions are e.g. to use narrow band radar receivers to scan the operating frequency range for interference, but such solutions often entails other negative side effects such as reduced time for radar operation and reduced probability of intercept. Bandwidth and operating frequency range of a radar system is primarily dependent on the application of the radar system.

For ESA, Electronically Scanned Array, radar applications, this may be an even more significant problem. Today ESA applications is becoming the predominant radar technique used within many application areas, and ESA radars may be more sensitive to jamming due to active electronics positioned directly behind the often wideband, wide angle, antenna elements.

Dynamic range is herein referred to as the difference in energy between the weakest and strongest signal a receiver is capable of detecting. Previously analogue-to-digital-converter receivers have been either relatively narrow band, with high performance in terms of e.g. dynamic range, or wide band but without the high dynamic range. However, recent development of receivers with analogue-to-digital conversion capability, wherein such wideband receivers still display sufficient performance in terms of dynamic range, has enabled new ways of designing radar systems.

Thus, there is room for further improvement.

BRIEF SUMMARY

An object of the present disclosure is to provide exemplary embodiments of a radar system which provides increased robustness against radar interference transmissions, and to provide exemplary embodiments of methods for controlling such radar systems. Objects of the present disclosure are achieved by a radar system according to claim 1 and by a method of controlling such radar system as disclosed in claim 5. Further advantageous embodiments of radar systems and control methods of the present disclosure are defined by the appended dependent claims as well as by the following description and the accompanying drawings.

Further objects of the present disclosure is to provide computer program comprising program code means for running any exemplary embodiment of the disclosed methods, computer readable medium carrying such computer program comprising program code means, and a control unit configured for running such computer program comprising program code means.

Hostile radar interference transmissions overpowering, degrading or weakening radar responses is a severe problem for radar applications. By identifying unoccupied frequency ranges, within which there is essentially no or at least very limited hostile radar interference transmission and/or backscatter, it is possible to effectively change operation frequency of the radar system in order to improve the functionality of the radar system. Further, by identifying the hostile radar interference transmissions it is also possible to remove such interfering transmissions by using adapted filter means to reduce the effect of radar interference transmissions.

According to the present disclosure essentially unoccupied frequency ranges, or frequency ranges with very limited interference levels, and radar interference transmissions may be detected and measured by means of a radar system comprising a radar antenna feeding two, in parallel arranged, receiving means, wherein one of the receiving means is used to monitor the frequency spectrum in order to detect interference and one of the receiving means is used for conventional radar operation such as detection of targets or like.

In general terms, during operation of a radar system a transmitting radar antenna, which may, but is not limited to, be a part of the radar system transmits a radar signal at a certain frequency. A receiving radar antenna, which may be the same radar antenna as used for transmission, but is not limited to be, and if being so is used together with a circulator or like, is configured for receiving at the frequency of a radar signal echo, or reply radar signal, of the transmitted radar signal. Such reply radar signal is e.g. generated if the transmitted radar signal hits a target or like. If the frequency of the radar signal is changed the frequency at which the receiving radar antenna is receiving reply radar signals is changed accordingly and vice versa. This may e.g. be done by means of changing the frequency of a local oscillator. This is a very simplified generalization of the functionality of a radar system, but normal operation of a radar system is considered to be part of common general knowledge and will not be further discussed herein.

According to one exemplary embodiment of a radar system for providing increased robustness against radar interference transmissions of the present disclosure, the radar system comprises:

at least one radar antenna configured at least for receiving a radar signal, wherein such radar signal may be a reply signal generated by that from a transmitted radar signal, wherein the transmitted radar signal may be, but is not limited to, transmitted by the radar antenna, hits a target or like, a radar signal dividing means, wherein the radar signal dividing means is configured for dividing a received radar signal into at least a first and a second received split radar signal, a first receiver device, wherein the first split radar signal is fed to the first receiver device, a second receiver device, wherein the second split radar signal is fed to the second receiver device, and the first receiver device is configured for monitoring, i.e. operating in, a first frequency range and the second receiver device is configured for monitoring a second frequency range.

For the first receiver device what is referred to as monitoring is normal operation of a receiver of a radar system, whereas what is referred to as monitoring for the second receiver device is instantaneous monitoring of the whole second frequency range.

The first received split radar signal is fed to the first receiving device and the second received split radar signal is fed to the second receiving device. The radar signal dividing means is defined as any means configured for dividing one signal into at least two signals, wherein the energy of the received radar signal is split into two received split radar signals together having essentially the same energy as the received radar signal, such as a power divider, a directional coupler or like. The splitting of the received radar signal may be done considering various aspects such as e.g. least necessary signal strength in order to provide the first receiver device with sufficient signal strength. Generally, for a receiver applies that, the smaller share of the received signal that is partitioned to the receiver, the lower is the sensitivity of the detection of the receiver. However, an insufficient sensitivity or otherwise too low signal strength of the split radar signal may be addressed by adding an amplifier. By arranging a suitable amplifier before the signal dividing means the splitting ratio of the received radar signal by the signal dividing means becomes less critical since, within reasonable limits, the first and second received split radar signal will be sufficiently strong for the first and second receiving devices to process independently of the splitting ratio.

The first and second receiving device, which are devices configured to process a received (split) radar signal fed to respective receiving device for further processing of the information retrievable from respective received (split) radar signal, will be discussed more in detail and defined later.

The exemplary embodiment is further characterized in that the second frequency range is wider than the first frequency range, meaning that the second frequency range extends over a larger frequency band than the first frequency range, and that the first frequency range is a subset of the second frequency range. Thus, the first frequency range covers a part of the second frequency range. Additionally the second receiver device is configured for measuring interference levels within the second frequency range, wherein interference levels are defined as the difference between the internally generated (thermal) noise and the externally generated intentional and unintentional interference.

Measuring interference levels is defined as first measuring the sum of internally generated interference (noise) and externally generated interference, and then computing the externally generated interference by subtracting the internally generated interference from the measured levels.

By measuring interference levels it is possible to determine if there are other frequency ranges, hereafter referred to as frequency channels, with less interference than the current operating frequency channel of the radar system. Operating frequency channel is herein defined as the frequency channel within which the radar system currently is operating, meaning that within that range of frequencies radar signals are transmitted, if a transmitting radar antenna is part of the radar system, and the receiving radar antenna is monitoring. If so, and if the difference in interference level between the current operating frequency channel and a possibly new operating frequency channel with lower interference level is sufficiently large, it may be reasonable to change operating frequency channel wherein the radar system may be operated more efficiently and/or with higher sensitivity. The frequency channel with the least interference level is hereinafter referred to as the most favourable frequency channel.

Further, another exemplary advantage of the exemplary embodiment of the radar system is that by measuring interference levels within the second frequency range also strong hostile radar interference transmissions outside of the operating frequency channel of the radar system can be avoided. Strong hostile radar interference transmission outside of the current operating frequency channel may cause detection of targets due to the non-linearity of the receiver device. By detecting such hostile radar interference transmission signals they can be removed by the use of filter means.

When referring to channel is a non-specified frequency range considered. Typically may an unmodulated pulse or a pulse wherein the frequency sweeps over e.g. 10 MHz be applied. The receiver is configured for managing the frequency sweep. When processing the received signal a digital filter, which is configured in accordance with the pulse used, may be applied. This is generally referred to as digital pulse compression.

It should be noted that the radar antenna transmitting a radar signal, and thereto associated signal generating means, may be, but is not limited to be, a part of the radar system. It is also possible to operate the radar system of the present disclosure with an external transmitting antenna transmitting radar signals.

According to one embodiment of the present disclosure the signal dividing means, possibly, but not necessarily provided with an amplifier before or after the received signal is split, is configured such that the first receiver device is not in any way negatively affected by that a second receiver device is arranged in parallel to the first receiver device and by that a portion of the received radar signal is split into a first and a second received split radar signal, wherein the second received split radar signal is fed to the second receiver device. Thus, according to a preferred exemplary embodiment the stronger signal of the first and second received split radar signal is fed to the first receiving device in order to ensure that the first receiving device has sufficient sensitivity.

According to another exemplary embodiment of a radar system for providing increased robustness against radar interference transmissions the first receiver device is a high dynamic range receiver and the second receiver device is a wideband receiver. The dynamicity of a receiver device herein refers to the difference between the weakest and the strongest signal that a receiver is capable of detecting, wherein high dynamic implies a relatively large difference in signal strength between the weakest and the strongest signal level that a receiver is capable of detecting. At least the high dynamic range receiver is a superheterodyne receiver with a fix intermediate frequency range at which the received analogue signal is digitalised. The wideband receiver is selected to be able to detect over a wide frequency spectrum, typically the complete radar operating bandwidth.

According to yet an exemplary embodiment of a radar system for providing increased robustness against radar interference transmissions at least the first receiver device is provided with a filter means. The filter means is configured for limiting the frequency input to the first receiver device, thus the filter means may e.g. be used to limit the frequency content of the signals fed to a high dynamic range receiver. The filter means is allocated to the fix intermediate frequency range, wherein it is not necessary to adapt the filter means if a change of operating frequency channel is executed. The frequencies of the operating frequency channel may be changed by means of a local oscillator. Also the other second receiver device may, but is not limited to, be provided with a filter means having essentially the same functionality as described above. The functionality of signal filters is considered to part of common general knowledge and will not be further disclosed herein.

The functionality and possible configurations of radar transmitters, receivers and filters is considered to be part of common general knowledge and will not be further discussed herein.

The radar antenna of the disclosed exemplary embodiments of radar system may be a conventional, mechanically scanned array, MSA, type, but according to one exemplary embodiment of a radar system for providing increased robustness against radar interference transmissions wherein the radar antenna is an electronically scanned array, ESA, radar.

Such electronically scanned array may be either an active electronically scanned array, AESA, thus antenna with active amplification, or passive electronically scanned array, PESA, without amplification. ESA radars may be even more sensitive to e.g. sidelobe and frequency interference than conventional, mechanically scanned radars, MSA due to the normally wide angle, wide frequency range of antenna elements. For such applications the exemplary embodiments of radar systems disclosed herein are advantageous since the first receiver device can be configured only for detecting within a selected, relatively narrow, operating frequency range, whereas the second receiver device monitors a wider frequency range in order to identify and measure interference transmission signals. Hence for PESA/AESA the exemplary embodiments of radar systems are advantageous.

Referring now to exemplary embodiments of control methods for controlling any of, or a combination of, the disclosed exemplary embodiments of radar systems, wherein the exemplary embodiments of control methods enables the use of the radar systems.

According to a preferred embodiment of a control method for controlling a radar system providing increased robustness against radar interference transmission, the method is applied for a radar system comprising:
  at least one radar antenna configured at least for receiving a radar signal,
  a radar signal dividing means, wherein the radar signal dividing means is configured for dividing a received radar signal into at least a first and a second received split radar signal,
  a first receiver device, wherein the first receiver device is configured for monitoring a first frequency range, and
  a second receiver device, wherein the second receiver device is configured for monitoring a second frequency range, in accordance with what previously has been disclosed.

The exemplary embodiment is characterized in that the first frequency range is a subset of the second frequency range and wherein the method further comprises the method step of:
  measuring interference levels within the second frequency range.

Measuring interference levels within the second frequency range, which includes interference levels within the first frequency range, in accordance with the exemplary embodiment of the method for controlling any exemplary embodiment of the previously disclosed radar system provides increased robustness and non-reduced detection range in complex electromagnetic environments e.g. by adapting the operating frequency channel to the spectral content of signals from hostile and friendly emitters. This effect may be reached either by detecting and measuring interference levels within the first frequency range, and as will be described below act accordingly, and/or by detecting and measuring interference levels within the second frequency range, as also will be described below and act accordingly.

According to a first aspect of the exemplary embodiments of control method disclosed herein, by identifying essentially unoccupied frequency channels or frequency channels with low interference levels, within which there is essentially no or at least very limited hostile radar interference transmission and/or backscatter, it is possible to effectively change operation frequency channel of the radar system in order to improve the functionality of the radar system.

According to an exemplary embodiment of a control method for controlling a radar system providing increased robustness against radar interference transmission, the method further comprises the method step of:
analysing the measured interference levels, and
detecting at least one favourable frequency channel within the second frequency range by analysing the measured interference levels.

A favourable frequency channel is herein defined as a range of frequencies at least sufficiently wide to serve as operating frequency channel of the radar system. The frequency width of such operating frequency channel is e.g. dependent on hardware configuration and operating mode of the radar system. According to one exemplary embodiment the operating frequency channel may be between 1 and 10 MHz.

Detecting at least one favourable frequency channel has the advantage that if it is detected that the current operating frequency range is exposed to radar interference transmissions the radar system may instantly switch to the detected favourable frequency channel. If no favourable frequency channel has been detected beforehand either a favourable frequency channel, with no or essentially lower radar interference transmissions, has to be detected before the change of operating frequency channel can be performed or the operating frequency channel has to be changed randomly, whereby there is an imminent risk that the new frequency channel also is exposed to radar interference transmissions or other conflicting transmissions. Either way, by detecting at least one favourable frequency channel beforehand the risk of delay, and thereby performance degradation, can be avoided.

The number of favourable frequency channels that are detected may be dependent on what criteria that are used to determine which frequency channel/channels that is/are favourable. Exemplary embodiments of criteria used in exemplary embodiments of methods will be disclosed later.

The analysing of the measured interference levels, as well as the execution of the exemplary embodiments of control methods as such disclosed herein, may be executed by a control unit such as a computer or like, by a separate control unit configured just for analysis or by a distributed control unit comprising a number of interconnected control units.

According to one embodiment of a control method for a radar system providing increased robustness against radar interference transmission all frequency channels within the second frequency range having an interference level below a predetermined interference level is defined as a favourable frequency channel.

The predetermined interference level may be set based on e.g. that the interference level should be 9 dB lower than the signal strength of an expected reply radar signal or that the interference level should not be any larger than e.g. 3 dB above thermal noise (18% reduction in detection range).

This exemplary embodiment has the advantage that if it is determined to change operating frequency range to a favourable frequency channel that frequency range will always be exposed to acceptable interference level.

According to another exemplary embodiment of a control method for a radar system providing increased robustness against radar interference transmission all frequency channels having a maximum interference level below the minimum measured interference level of the first frequency range is a favourable frequency channel. Thus, all frequency ranges having lower interference level than the current operating frequency range is defined as favourable frequency channels.

According to yet an exemplary embodiment of a control method for a radar system providing increased robustness against radar interference transmission the favourable frequency channel is simply the frequency channel with the lowest measured interference level. This exemplary embodiment assures that if the operating frequency channel of the radar system is changed the new operating frequency channel will always be the operating frequency range with the lowest interference level.

According to other exemplary embodiments a predetermined number of frequency channels, starting from the frequency channel with the lowest interference level, are defined as favourable frequency channels.

Which criteria that are used to determine favourable frequency channel may be determined based on e.g. the configuration and performance of present hardware, operating conditions or the purpose of operating the radar system.

As previously mentioned, according to an exemplary embodiment of a control method for a radar system providing increased robustness against radar interference transmission, wherein the radar system additionally comprises at least one radar antenna configured at least for transmitting a radar signal at a transmit frequency channel. The antenna configured for transmitting may be, but is not limited to, the same antenna as the antenna configured for receiving radar signals. Further, the transmitting antenna may comprise one or a plurality of antenna elements, i.e. an antenna array. The configuration of antennas arranged for transmitting and/or receiving, comprising one or a plurality of antenna elements, is considered to be part of common general knowledge and is not part of the invention per se, thus will not be further disclosed herein. The radar signal received by the radar antenna may be a response signal from the transmitted radar signal transmitted by the radar antenna configured at least for transmitting a radar signal, wherein the transmit frequency channel lies within the first frequency range. The method further comprises the method steps of:
    identifying radar interference levels within the first frequency range, and
    changing transmit frequency channel of the radar system to a favourable frequency channel and changing the first frequency range monitored by the first receiver device to cover the favourable frequency channel.

Thus, if interference levels considered to be degrading for the operation of the radar system is identified the operating frequency, comprising both transmission and reception, may be changed to a previously identified favourable frequency channel with significantly lower or no interference. The radar interference level within the first frequency range may be identified either by the first receiver device, monitoring the first frequency range, or by the second receiver device, monitoring the second frequency range but wherein the first frequency range is a subset of the second frequency range.

According to yet an exemplary embodiment the change of operating frequency channel may be executed randomly, wherein the change of operating frequency channel is changed to a previously identified, in accordance with what previously has been disclosed, favourable frequency channel. The timing and repetition frequency of such random change of operating frequency channel may e.g. be dependent on the intended use of the radar system or the impending risk of hostile jamming. Randomly changing the operating frequency channel has the advantage that e.g. hostile jamming or directed interfering transmissions may be avoided.

According to a second aspect of the exemplary embodiments of control method disclosed herein, by identifying the radar interference transmissions it is also possible to remove such interfering transmissions by using adapted filter means to reduce the effect of radar interference transmissions.

According to one exemplary embodiment of a control method for a radar system providing increased robustness against radar interference transmission the method comprises the method steps of:
    analysing the measured interference levels, and
    identifying radar interference levels within the second frequency range, but outside of the first frequency range.

Thereby radar interference levels outside of the current operating frequency channel of the radar system, which is within the first frequency range, can be detected. If there are significant radar interference levels at frequencies close to the operating frequency channel of the high dynamic range, first receiver device such interference levels may interfere the operation of the high dynamic range first receiver device.

According to another exemplary embodiment of a control method for a radar system providing increased robustness against radar interference transmission the radar system additionally comprises, corresponding to what has been previously disclosed, at least one radar antenna configured at least for transmitting a radar signal at a transmit frequency channel, wherein the radar signal received by the radar antenna is a response signal from the transmitted radar signal. The transmit frequency channel lies within the first frequency range. When at least one radar interference level has been identified within the second frequency range the method further comprises the method step of:
    adapting the configuration of the radar system with respect to the identified radar interference level by:
        changing transmit frequency channel of the transmitted radar signal and changing the first frequency range monitored by the first receiver device, such that the radar system transmits within and monitors a new frequency channel, or changing the configuration of the filter means to limit the frequency input to the first receiver device such that the identified radar interference levels within the second frequency range, but outside of the first frequency range, are removed.

Thus, the interference of the operation of the high dynamic range, first receiver device can be resolved either by that the operating frequency channel of the radar system is changed to a new frequency range or, if a filter means is present, by that the filter means is re configured to remove interference transmissions close to the first frequency range such that they do not affect the performance and sensitivity of the first receiver device. Generally the filter means is located to the intermediate frequency, which is provided by mixing signal with the carrier frequency provided by a mixer, but by reconfiguring the filter means it is possible to remove certain frequencies or frequency ranges. This will be disclosed more in detail in the detailed description.

According to yet an exemplary embodiment of a control method for a radar system providing increased robustness against radar interference transmission the new frequency channel is a favourable frequency channel. By changing the operating frequency channel to a favourable frequency channel, wherein the favourable frequency channel may be defined in accordance to any of the above examples, it is assured that the new frequency channel is not exposed to severe interference levels.

The operations of the herein disclosed methods are preferably performed by a computer, control unit or like, thus according to yet exemplary embodiments of the present disclosure, the present disclosure comprises:

a computer program comprising program code means for performing the steps of any exemplary embodiment of, or a combination of exemplary embodiments, of methods of the present disclosure when said computer program is run on a computer device or like, a computer readable medium carrying a computer program comprising program code means for performing the steps of any exemplary embodiment of the methods when said computer program is run on a computer device or like and a control unit for controlling the radar system according to any of the disclosed exemplary embodiments of the present disclosure, wherein the control unit is being configured to perform the steps of any exemplary embodiment of the methods.

BRIEF DESCRIPTION OF THE FIGURES

The present disclosure will now be described in detail with reference to the figures, wherein.

It should be added that the following description of the examples is for illustration purposes only and should not be interpreted as limiting the invention exclusively in accordance to these exemplary embodiments.

DETAILED DESCRIPTION OF VARIOUS EMBODIMENTS

Figure 1:
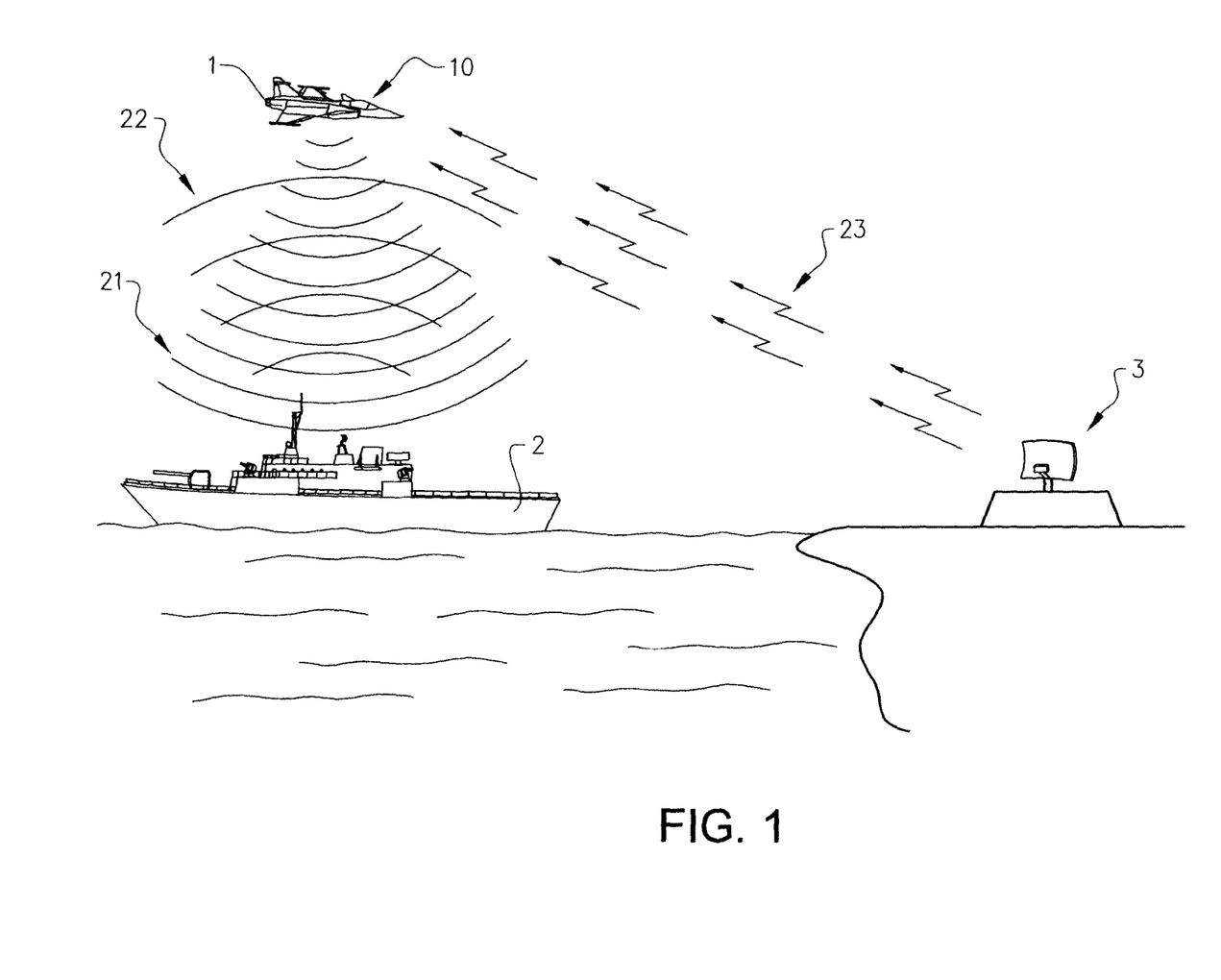
FIG. 1 shows an example of how a radar system according to the present disclosure may be implemented.

FIG. 1 shows an example of how a radar system 10 configured for receiving radar signals 22, such as reply signals, and providing increased robustness against radar interference transmissions 23 according to the present disclosure may be implemented. The radar system 10 of the aeroplane 1 may be, but is not limited to be, a radar system 10 configured for both transmission and for reception, wherein also a e.g. a circulator or like is required in order to separate a transmitted radar signal 21 from a received radar signals 22, also referred to a reply signal. The exemplary embodiment of FIG. 1 discloses that the radar system 10 transmits radar signals 21 in the direction of a target 2, wherein the target 2 in the exemplary embodiment of FIG. 1 is a ship, wherein the target 2 reflects the transmitted radar signals 21 wherein reply signals are generated. Further, FIG. 1 schematically discloses how a hostile transmitter 3, wherein the hostile transmitter 3 in the exemplary embodiment of FIG. 1 is a ground based radar transmitter, transmits radar interference transmissions 23 giving rise to increased interference levels.

Figure 2A:
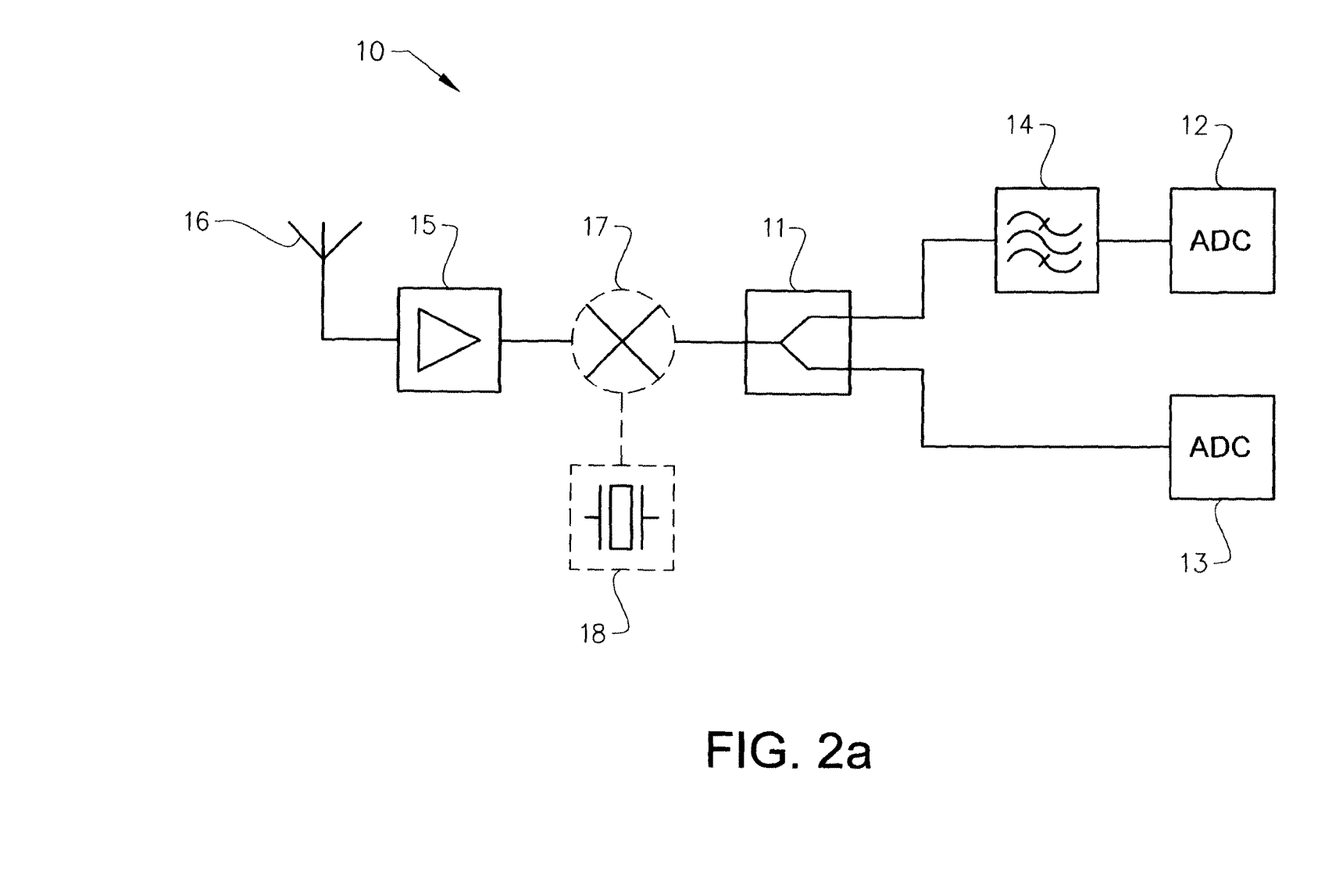
FIG. 2a shows a schematic block diagram over a first exemplary embodiment of a radar system according to the present disclosure.

FIG. 2a discloses a schematic block diagram over a first exemplary embodiment of a radar system 10 according to the present disclosure. The radar system 10 comprises a radar antenna 16 configured at least to receive a radar signal. The radar signal is subsequently fed to a radar signal dividing means 11, wherein the radar signal dividing means 11 is configured for dividing the received radar signal into a first and a second received split radar signal. The radar system 10 further comprises a first receiver device 12 and a second receiver device 13, wherein the first received split radar signal may be fed to the first receiver device 12 and the second received split radar signal may be fed to the second receiver device 13. The first and second receiver device 12, 13 are preferably receiver devices configured for converting a received analogue signal into a digital signal.

According to the exemplary embodiment of FIG. 2a the first receiver device 12 is also provided with a filter means 14. The filter means 14 is configured at least for limiting the frequency content of the signals fed to the analogue to digital converter of the first receiver device 12. Further, According to the exemplary embodiment of FIG. 2a an amplifier 15 is provided between the radar antenna 16 and the radar signal dividing means 11, wherein the amplifier may be configured to amplify the received radar signal before the radar signal is divided by the radar signal dividing means 11 into the first and the second received split radar signal, such that respective first and second received split radar signal is sufficiently strong in order to be able to detect, measure and analyse by respective first and second receiver device 12, 13. Amplifiers may also be arranged between the radar signal dividing means 11 and respective first and second receiver device 12, 13 in order for the first and second receiver device 12, 13 to be able to detect, measure and analyse by respective first and second received split radar signal.

According to exemplary embodiments of the present disclosure the first receiver device 12 may be a high dynamic range receiver and the second receiver device 13 may be a wideband receiver.

Further, according to yet exemplary embodiments of the present disclosure a mixer 17 may be provided e.g. between the amplifier 15 and signal dividing means 11. The mixer may also be provided e.g. between the antenna and the amplifier. The mixer 17 is further connected to a local oscillator 18. The local oscillator 18 is configured to produce a waveform, such as e.g. a sine wave, which is mixed in the mixer 17 with the received radar signal, shifting it to a specific intermediate frequency. The filter means 14 is configured according to the intermediate frequency. It is the frequency of the waveform from the local oscillator 18 that is changed when the operating frequency channel, i.e. the frequency currently used for the transmitted and received radar signals, of the radar system is changed.

Figure 2B:
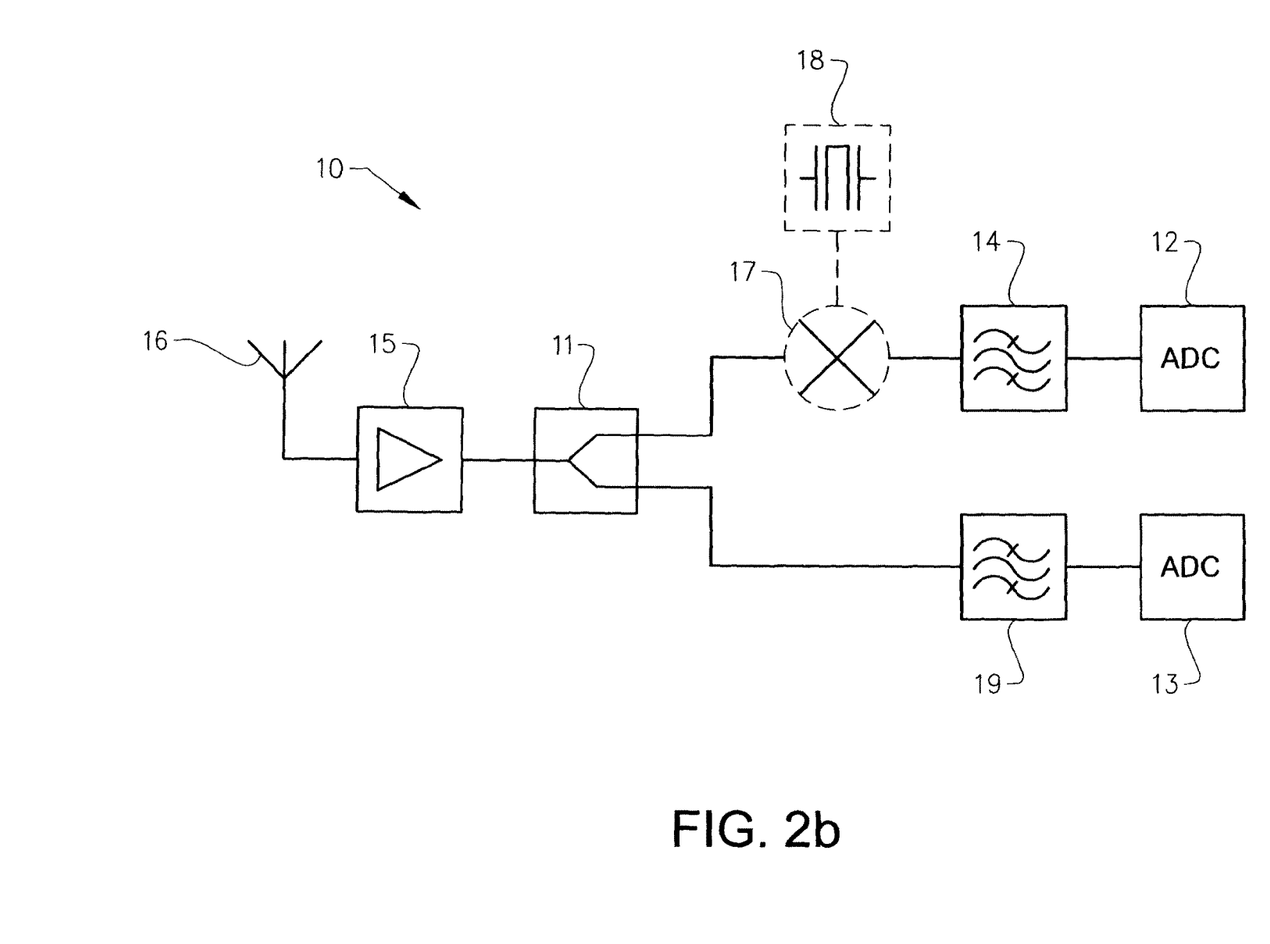
FIG. 2b shows a schematic block diagram over a second exemplary embodiment of a radar system according to the present disclosure.

FIG. 2b discloses a schematic block diagram over a second exemplary embodiment of a radar system 10 according to the present disclosure. The second exemplary embodiment of FIG. 2b corresponds to the first exemplary embodiment of FIG. 2a except for that:

according to FIG. 2b also the second receiver device 13 is provided with a filter means 19, controlling the operating bandwidth of the second receiver device 13, and according to FIG. 2b the mixer 17, which is connected to the local oscillator 18, is arranged between the signal dividing means 11 and the filter means 14 of the first receiver device 12.

FIG. 2b discloses an alternative exemplary embodiment of how the schematic radar system 10 may be arranged. The filter means 14 of the first receiver device 12 is typically a narrow band filer of e.g. 10 MHz whereas the filter means 19 of the second receiver device 13 typically is a broad band filter or e.g. 1000 MHz.

The exemplary embodiment schematically disclosed in FIG. 2a has the advantage that the embodiment has reasonably high performance in terms of e.g. selectivity while still being reasonably compact. The exemplary embodiment schematically disclosed in FIG. 2b has the advantage that the embodiment is even more compact. It is also possible to combine the exemplary embodiment of FIG. 2a and the exemplary embodiment of FIG. 2b (not shown), wherein the high dynamic range receiver device is provided with two superheterodyne receivers and the wideband receiver is provided with one superheterodyne receiver. The latter exemplary embodiment has the advantage that such radar system will have very high performance with superior selectivity, however to the expense of compactness.

Figure 3:
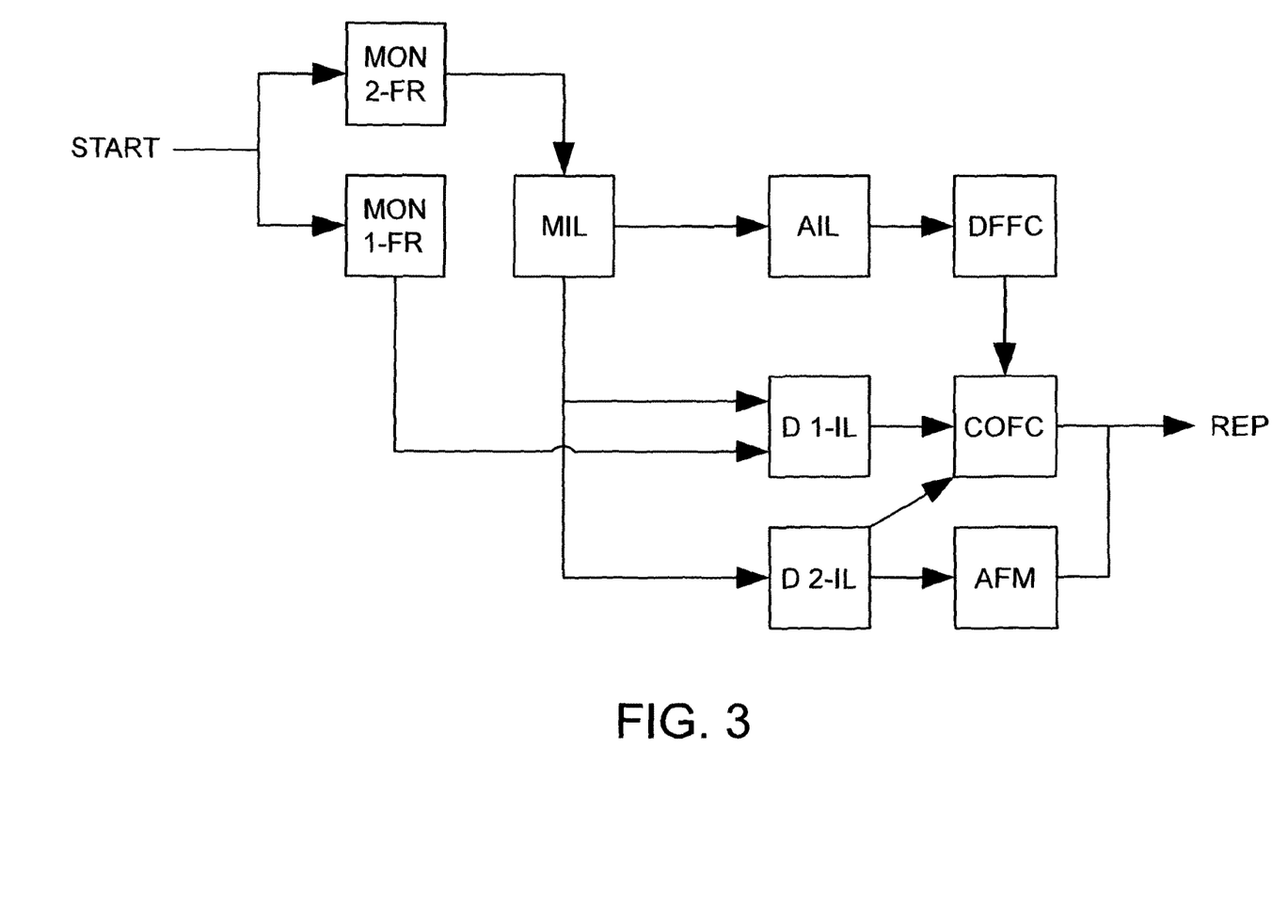
FIG. 3 shows a flowchart over an exemplary embodiment of a method according to the present disclosure.

Referring now to FIG. 3, disclosing exemplary embodiments of control methods providing increased robustness against radar interference transmission of the present disclosure. The control methods are preferably applied for a radar system comprising at least one radar antenna configured at least for receiving a radar signal, but which also may be configured to transmit radar signals, a radar signal dividing means, a first receiver device and a second receiver device. The first receiver device is configured for monitoring a first frequency range and the second receiver device is configured for monitoring a second frequency range, wherein the first frequency range is a subset of the second frequency range.

Exemplary embodiments of the present disclosure is initiated by that the first frequency range is monitored by the first receiver device MON 1-FR and that the second frequency range is monitored by the second receiver device MON 2-FR. The monitoring of the second frequency range MON 2-FR enables that interference levels within the second frequency range can be measured MIL.

According to further exemplary embodiments of the present disclosure the measured interference levels of the second frequency range are analysed, AIL, wherein at least one favourable frequency channel can be detected DFFC. The detection and selection of what is considered to be a favourable frequency channel, how many frequency channels that are detected etc. may be based on various criteria and may be dependent on e.g. the type of operation the radar system is intended for, hardware configuration and/or the average interference level within the second frequency range.

According to yet further exemplary embodiments of the present disclosure the method comprises identifying radar interference levels within the first frequency range, wherein such interference levels may be identified D 1-IL and/or measured by the first and/or the second receiver device since the first frequency range monitored by the first receiver device is a subset of the second frequency range.

If interference levels within the first frequency range is identified the operation frequency channel of the radar system is changed to a previously identified favourable frequency channel COFC. Changing operation frequency channel of the radar systems means that transmit frequency channel of the radar system, if the radar system comprises a transmitting radar antenna, and the frequency channel monitored by the first receiver device, i.e. the first frequency range, is changed. This is e.g. done by means of the local oscillator. It is also possible to use different local oscillators for transmission and reception.

According to further exemplary embodiments of the present disclosure the method comprises identifying radar interference levels within the second frequency range, wherein such interference levels are identified D 2-IL and/or measured by the second receiver device.

If interference levels outside of, but close to, the first frequency range and within the second frequency range is identified and is considered to have degrading effect on the high dynamic, first receiver device either the operation frequency channel of the radar system is changed to a previously identified favourable frequency channel COFC or the filter means may be adapted AFM to remove such interference levels.

The exemplary embodiments of the present disclosure, comprising one or a combination of the method steps disclosed herein, are repeated continuously.

Figure 4:
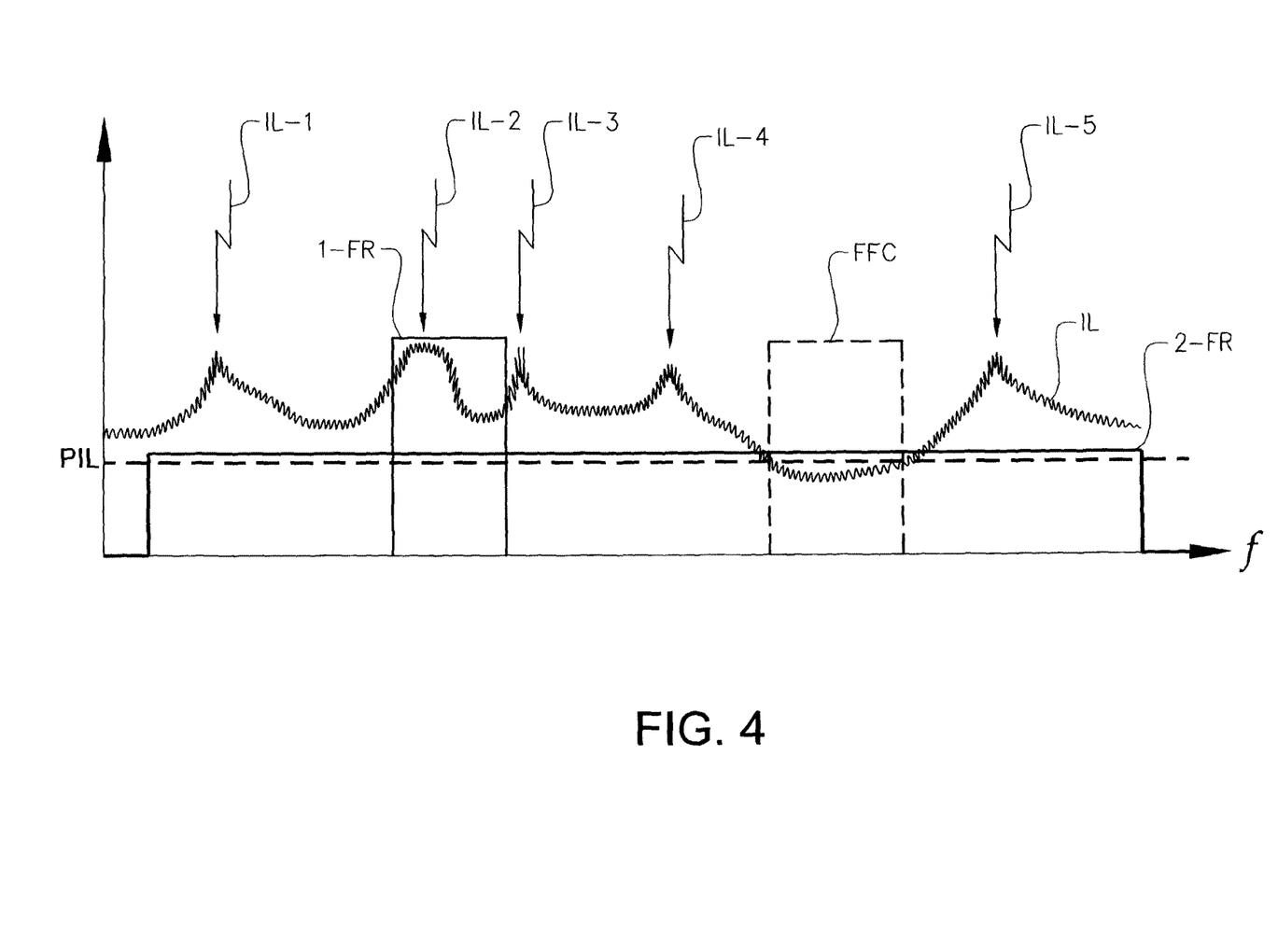
FIG. 4 shows a simplified schematic view of a generic frequency spectrum for further clarification.

Finally referring to FIG. 4 disclosing a very simplified schematic view of a generic frequency spectrum, wherein frequency, f, is indicated on the horizontal x axis. The vertical y axis arbitrarily indicates different levels. FIG. 4 discloses an exemplary embodiment of a first frequency range 1-FR of a first receiver device and of a second frequency range 2-FR of a second receiver device, wherein the first frequency range 1-FR is a subset of the second frequency range 2-FR. Additionally are a number of interference levels IL-1, IL-2, IL-3, IL-4, IL-5 schematically indicated. In FIG. 4 are all interference levels IL-1, IL-2, IL-3, IL-4, IL-5 schematically indicated as similar interference occurring at a single frequency but in a realization the schematically indicated interference levels IL-1, IL-2, IL-3, IL-4, IL-5 may e.g. be interference levels caused by broadcasting transmission, emergency transmissions or first and foremost hostile transmissions intended to interfere with the operation of the radar system, wherein the interference levels may be of various strength or severity and extend over various frequency ranges. For further clarification, a simplified, schematic interference level sweep over the entire disclosed generic frequency range IL is also shown whereby it is indicated that the schematically indicated interference levels IL-1, IL-2, IL-3, IL-4, IL-5 give rise to a more or less distinct increase in interference level at respective frequency. Also one favourable frequency channel FFC is indicated. According to exemplary embodiments of the disclosed method the favourable frequency channel FFC is determined to be at a frequency range where the interference level IL is low.

In order to further clarify the present disclosure, referring now to clarifying examples:

According to a first example, given the situation that a first receiver device is operating at the first frequency range 1-FR and that an the interference level IL-2 is detected, measured and/or analysed by a second receiver device monitoring the second frequency range 2-FR, wherein the first frequency range 1-FR is a subset of the second frequency range 2-FR. In accordance with exemplary embodiments of the present disclosure the interference level IL of the second frequency range 2-FR is, and has been, measured and analysed whereby the favourable frequency channel FFC has been detected beforehand. As the interference level IL-2 is detected a change of operating frequency channel can be performed immediately without first having to analyse currently available frequency spectrum or change operating frequency channel randomly and risk that the new operating frequency range has even higher interference level. Thus, a change to the least interfered operating frequency channel, or at least an operating frequency channel with significantly lower interference level, can be executed.

According to a second example, given the situation that a first receiver device is operating at the first frequency range 1-FR and that the interference level IL-3 is detected by a second receiver device monitoring the second frequency range 2-FR. In accordance with other exemplary embodiments of the present disclosure the interference level IL of the second frequency range 2-FR is, and has been, measured and analysed whereby the favourable frequency channel FFC has been detected beforehand. As the interference level IL-3 is detected and measured by the second receiver device, wherein the interference level IL-3 is very close to the operating frequency range of the first receiver device, in order to avoid degradation of the performance of the high dynamic, first receiver device a change of operating frequency channel to the favourable frequency channel can be executed. The situation of the second example could also have been resolved my adjusting a filter means of the first receiver device such that the interference level IL-3 was removed.

Also, an example of a predetermined interference level PIL is indicated in FIG. 4. According to one exemplary embodiment of the present invention all operating frequency channels having an interference level below the predetermined interference level PIL are considered to be favourable frequency channels FFC.

The generic frequency spectrum of FIG. 4 may e.g. extend over the operating frequency range of the second receiver device, 2-FR, which for an S-band radar could be e.g. 3.0-3.5 GHz, and for an X-band radar 9-10 GHz.

It is to be understood that the present invention is not limited to the embodiments described above and illustrated in the drawings; rather, the skilled person will recognize that many changes and modifications may be made within the scope of the appended claims.

The invention claimed is:

1. A control method for a radar system (10) providing increased robustness against radar interference transmission (23), wherein the method is applied for a radar system (10) comprising:
at least one radar antenna (16) configured at least for receiving a radar signal (22);
a radar signal dividing means (11), wherein the radar signal dividing means (11) is configured for dividing a received radar signal (22) into at least a first and a second received split radar signal;
a first receiver device (12), wherein the first received split radar signal is fed to the first receiver device (12);
a second receiver device (13), wherein the second received split radar signal is fed to the second receiver device (13), and
wherein the first receiver device (12) is configured for monitoring a first frequency range (1-FR) and the second receiver device (13) is configured for monitoring a second frequency range (2-FR),
wherein the first frequency range (1-FR) is a subset of the second frequency range (2-FR) and wherein the method further comprises the method step of measuring interference levels (IL) within the second frequency range (2-FR), analyzing the measured interference levels, and detecting at least one favorable frequency channel (FFC) within the second frequency range (2-FR) by analyzing the measured interference levels (IL), wherein all frequency channels within the second frequency range (2-FR) having an interference level below a predetermined interference level (PIL) is a favorable frequency channel (FFC), and/or wherein the one favorable frequency channel (FFC) is the frequency channel with the lowest measured interference level (IL).

2. The control method for a radar system (10) according to claim 1, wherein all frequency channels having a maximum interference level below the lowest measured interference level of the first frequency range (1-FR) is a favorable frequency channel (FFC).

3. The control method for a radar system (10) according to Claim 1, wherein the radar system (10) additionally comprises:
at least one radar antenna (16) configured at least for transmitting a radar signal (21) at a transmit frequency channel,
wherein the radar signal (22) received by the radar antenna (16) is a response signal from the transmitted radar signal (21),
wherein the transmit frequency channel lies within the first frequency range (1-FR), and
wherein the method further comprises the method steps of:
identifying radar interference levels (IL-2) within the first frequency range (1-FR),
changing transmit frequency channel of the radar system (10) to a favorable frequency channel (FFC), and
changing the first frequency range (1-FR) monitored by the first receiver device (12) to cover the favorable frequency channel (FFC).

4. The control method for a radar system (10) according to claim 1, wherein the method further comprises the method steps of:
analysing the measured interference levels (IL), and
identifying radar interference levels (IL) within the second frequency range (2- FR), but outside of the first frequency range (1-FR).

5. The control method for a radar system (10) according to claim 4, wherein the radar system (10) additionally comprises:
at least one radar antenna (16) configured at least for transmitting a radar signal (21) at a transmit frequency channel, wherein the radar signal (22) received by the radar antenna (16) is a response signal from the transmitted radar signal (21), wherein the transmit frequency channel lies within the first frequency range (1-FR), and wherein the method further comprises the method step of, when at least one radar interference level (IL-3) has been identified within the second frequency range (2-FR), adapting the configuration of the radar system (10) with respect to the identified radar interference level (IL-3) by:

changing transmit frequency of the transmitted radar signal (21) and changing the first frequency range (1-FR) monitored by the first receiver device (12), such that the radar system (10) transmits within and monitors a new frequency channel, or changing the configuration of the filter means (14) to limit the frequency input to the first receiver device (12) such that the identified radar interference levels (IL-3) within the second frequency range (2-FR), but outside of the first frequency range (1-FR), are removed.

6. The control method for a radar system (10) according to claim 5, wherein the new frequency channel is a favorable frequency channel (FFC).

7. The control method for a radar system (10) according to claim 1, wherein a computer program comprising program code means performs the steps of claim 1 when the computer program is run on a computer device.

8. The control method for a radar system (10) according to claim 1, wherein a control unit is being configured to perform the steps of claim 1.

* * * * *